United States Patent [19]

Fuse

[11] Patent Number: 4,542,845

[45] Date of Patent: Sep. 24, 1985

[54] ROBOT-TYPE WELDING APPARATUS

[75] Inventor: Genzo Fuse, Higashimatsuyama, Japan

[73] Assignee: Honda Giken Kogyo Kabushiki Kaisha, Tokyo, Japan

[21] Appl. No.: 369,124

[22] Filed: Apr. 16, 1982

[30] Foreign Application Priority Data

| Apr. 23, 1981 | [JP] | Japan | 56-57847[U] |
| Apr. 23, 1981 | [JP] | Japan | 56-57848[U] |
| Apr. 23, 1981 | [JP] | Japan | 56-61487 |
| Apr. 25, 1981 | [JP] | Japan | 56-60244[U] |

[51] Int. Cl.$^4$ .............................................. B23K 9/12
[52] U.S. Cl. ................................... 228/45; 219/125.1
[58] Field of Search ............ 228/45; 219/86.25, 124.1, 219/125.1

[56] References Cited

U.S. PATENT DOCUMENTS

| 2,818,494 | 12/1957 | Bernard | 219/125.1 |
| 3,665,148 | 5/1972 | Yasenchak et al. | 219/125 |
| 3,708,099 | 1/1973 | Nuccel | 228/45 |
| 4,356,378 | 10/1982 | Cloos et al. | 219/124.1 |
| 4,390,775 | 6/1983 | Biava | 219/125.1 |

FOREIGN PATENT DOCUMENTS

| 2702303 | 7/1978 | Fed. Rep. of Germany | 228/45 |
| 2499729 | 8/1982 | France | 228/45 |
| 2099350 | 12/1982 | United Kingdom | 219/86.25 |
| 0598751 | 3/1978 | U.S.S.R. | 228/45 |
| 0721302 | 3/1980 | U.S.S.R. | 228/45 |

Primary Examiner—Kenneth J. Ramsey
Assistant Examiner—Kurt Rowan
Attorney, Agent, or Firm—Armstrong, Nikaido, Marmelstein & Kubovcik

[57] ABSTRACT

A robot-type welding apparatus including a stationary main body, a supporting arm extending from a moveable forwardly and rearwardly of the main body, a tiltable wrist base body pivotally supported on the front end portion of the supporting arm, a shaft rotatably extending longitudinally through and supported by the wrist base body, a wrist member 6 to the front end of the shaft, an expansion arm member mounted on the wrist member substantially at right angles to the shaft being moveable along its longitudinal axis relative to the wrist member, and a welding gun attached to the forward end of the expansion arm member. A mechanism for moving the supporting arm relative to the main body, a mechanism for tilting the wrist base body relative to the supporting arm, a mechanism for rotating the shaft relative to the wrist base body, and a mechanism for moving the expansion arm member relative to the wrist member are provided.

4 Claims, 11 Drawing Figures

ROBOT-TYPE WELDING APPARATUS

BACKGROUND OF THE INVENTION

This invention relates to a robot type welding apparatus which is chiefly used, in the fabricating of a car body of a motorcar, to apply spot welding to a peripheral edge of an opening portion of the car body such as that of a door attaching portion or the like.

As to an apparatus of this kind, providing a welding gun on a wrist mechanism on a front end portion of a supporting arm extending from main body of a robot is known. This type of apparatus, however, is inconvenient in that, for making the welding gun cable freely to any part of the whole peripheral edge of the foregoing opening portion, it is necessary that the supporting arm and the wrist mechanism be comparatively complicated in construction and that every moveable portion of them is given comparatively large movements. Thus, it cannot be avoided that the whole of the apparatus becomes comparatively large-sized and high priced.

OBJECTS AND SUMMARY OF THE INVENTION

It is an object of the present invention to provide a robot-type welding apparatus which can freely extend and permit welding on any part of an entire peripheral edge of an opening portion of the car body such as that of a door attaching portion.

It is a further object of the present invention to provide such a welding apparatus having a support arm and wrist mechanism thereon which is comparatively simple in structure.

It is yet a further object of the invention to provide a welding apparatus that does not require comparatively large movements of all of the parts thereof to accomplish the above object of being able to freely reach to any part of a whole peripheral edge.

It is still a further object of the present invention to provide a welding apparatus that is relatively inexpensive to manufacture and relatively simple to operate.

These objects and other objects with the attendant advantages thereof which will become readily apparent to a person of ordinary skill in the art considering the following description are made possible in a robot-type welding apparatus comprising a stationary main body, a supporting arm extending from and moveable forwardly and rearwardly of the main body having a front end portion, a tiltable wrist base body pivotally supported on the front end portion, a shaft rotatable extending longitudinally through and supported by the wrist base body having a front end, a wrist member fixed to the front end of the shaft having a front surface, an expansion arm member mounted on the wrist member substantially at right angles thereto and being moveable along its longitudinal axis relative to the wrist member having a forward end, and a welding gun attached to the forward end of the expansion arm member. Means for moving the supporting arm relative to the main body, means for tilting the wrist base body relative to the supporting arm, means for rotating the shaft relative to the base body, and means for moving the expansion member relative to the wrist member are also provided.

The base body can be pivotally supported at a portion which is near the front end thereof on the supporting arm.

The expansion arm member can comprise a pair of right and left guide rods interconnected at both ends through respective cross members. These left and right guide rods are inserted through a pair of left and right bearing members provided on the front surface of the wrist member so as to be supported slidably thereon. One of the guide rods has on one side surface thereof a rack. The means for moving the expansion member can comprise a bracket extending laterally from the wrist member having a front portion, a gear provided on the front portion in engagement with the rack of one of the guide rods, and an operation cylinder of the hydraulic type or the like guiding the gear provided ahead of the gear.

The expansion arm member can also be provided at its front end portion with an operation transformer for the welding gun. The shaft can be provided with a pair of longitudinally extending guide openings formed therein, an extended portion projecting from a rear end portion of the shaft, a pair of front and rear feeding rings arranged in sliding contact with feeding terminals on the lateral outside thereof fixedly provided on the periphery of the extended portion, and a pair of positive and negative feeding cables extending from the transformer passing through the pair of guide openings and extending rearwardly for being connected to the pair of feeding rings by means of respective screws or the like.

DETAILED DESCRIPTION OF A PREFERRED EMBODIMENT

One embodying example of this invention will now be explained with reference to the accompanying drawings:

Referring to the drawings, a main body 1 of a robot includes a stationary machine base, is provided at its lower surface with a supporting arm 2 projecting therefrom in a substantially horizontal direction. The arm 2 is moveable forwards and rearwards along a pair of right and left guide rods 4, 4 by an operation cylinder 3, and is provided at its front end portion with a wrist mechanism 5.

Figure 1:
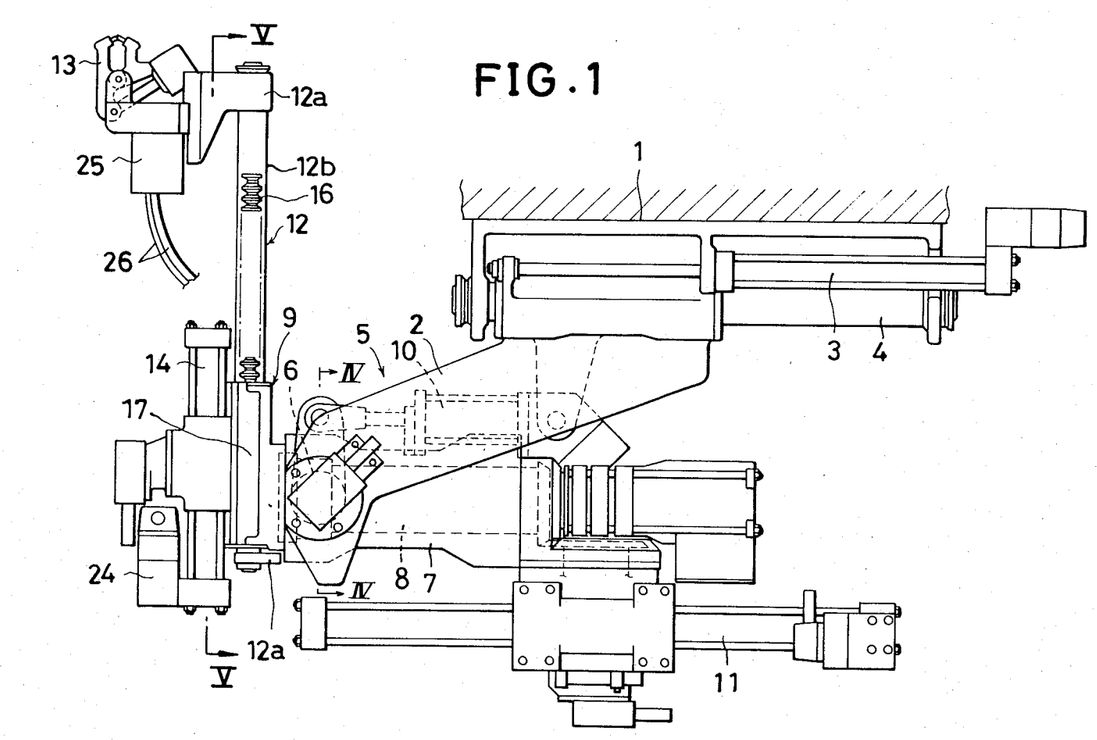
FIG. 1 is a side view of one example of this invention apparatus.
Figure 2:
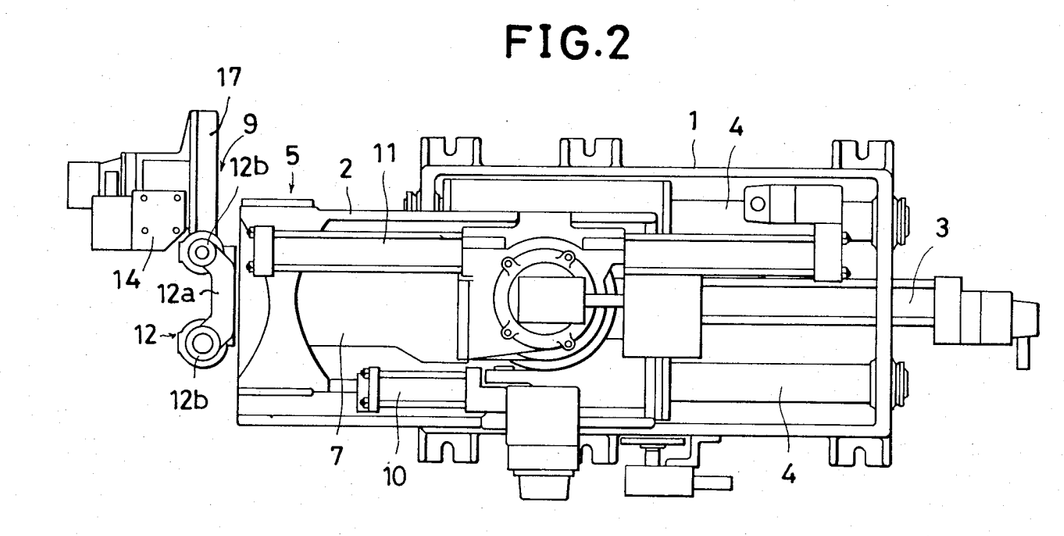
FIG. 2 is a bottom plan view thereof.
Figure 3:
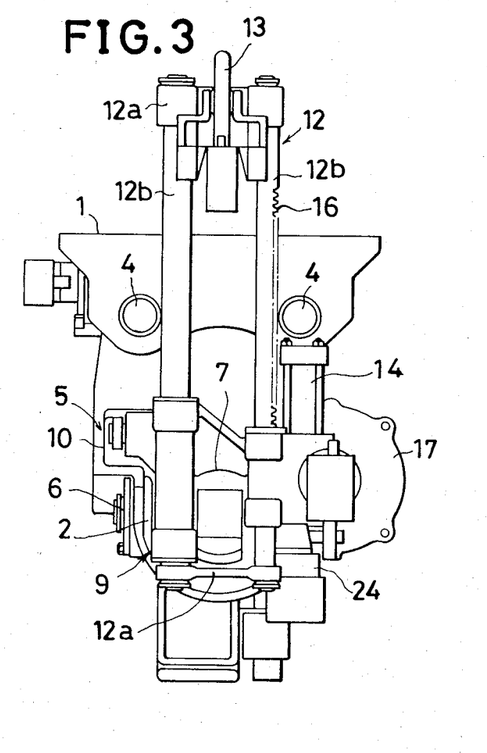
FIG. 3 is a front view thereof.
Figure 4:
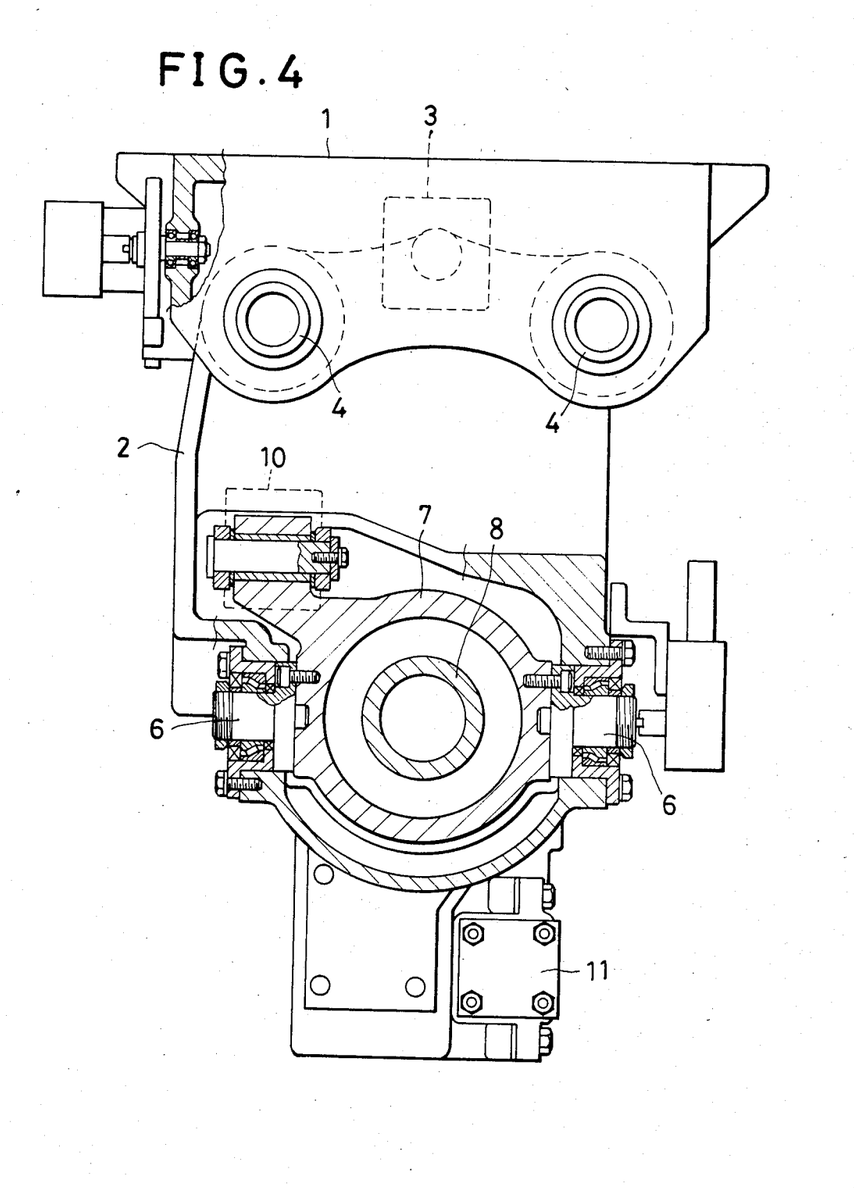
FIGS. 4 and 5 are sectional views respectively taken along the lines IV—IV and V—V in FIG. 1.

The wrist mechanism 5 comprises a wrist base body 7 pivotally supported on the front end portion of the arm 2 through a pair of horizontally extending right and left shafts 6, 6 as shown clearly in FIG. 4. A wrist member 9 is fixed to the front end of a rotary shaft 8 extending longitudinally through the wrist base body 7. The wrist base body 7 is tiltable about the shafts 6, 6 by operation of an operation cylinder 10 provided between the same and the arm 2. The wrist member 9 is rotatable through the rotary shaft 8 by an operation cylinder 11 provided below the same. The wrist member 9 is provided with an arm member 12 projecting sideways therefrom at substantially right angles to the rotary shaft 8. The arm member 12 is provided at its forward end portion with a welding gun 13. The arm member 12 is constructed to be an expansion type one which can be moved to advance and retreat by an operation cylinder 14.

Figure 10:
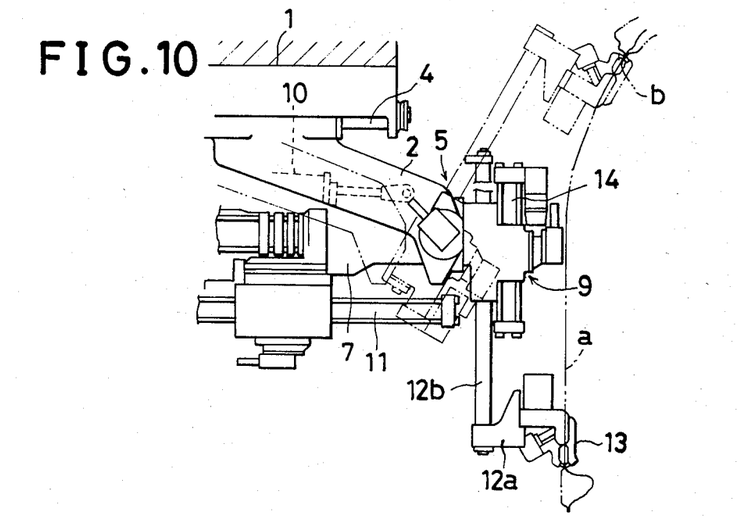
Figure 11:
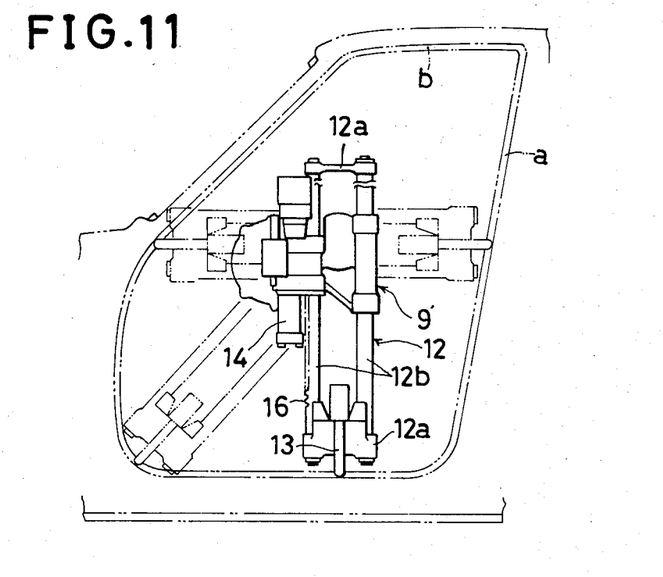

The operation thereof is, for instance, as shown in FIGS. 10 and 11. Namely, the welding gun 13 is placed into an opening portion b of a car body a and is properly moved to any part of the peripheral edge of the same. For instance, it is possible to change freely the welding gun 13 in position from the condition that the same is applied to a lower side portion of the peripheral edge of the opening portion b as shown by solid lines in FIG. 10, to the condition that the same is applied to an upper side portion of the peripheral edge thereof as shown by chain lines in the same Figure. In addition, it is possible to change freely the gun 13 in position from the condition that the same is applied to the lower side portion of the peripheral edge of the open portion b as shown by solid lines in FIG. 11, to any desired condition that the same is applied to a left side portion, a right side portion or further an oblique corner side portion thereof as shown by chain lines in the same Figure.

In other words, the welding gun 13 can be given any desired motion to be applied to any part of the whole periphery thereof by a forward or backward movement of the supporting arm 2, a tilting movement of the wrist base body 7, a rotation movement of the wrist member 9 and expansion or contraction movement of the arm member 12, so that spot welding can be given to any desired portions of the whole peripheral edge.

The fundamental construction of this invention apparatus and the fundamental operation thereof are as described above, but there are provided additionally various exploits in the illustrated example as described below in detail.

A first point thereof is in the case if the wrist base body 7 were to be pivotally supported at its rear end portion thereof, on the supporting arm 2, the welding gun 13 would be given a comparatively large movement and consequently setting thereof in a predetermined position becomes difficult even by a slight tilting movement of the base body 7. Accordingly, in the illustrated example, the wrist base body 7 is pivotally supported at its portion which is near the front end thereof on the supporting arm 2.

A second point thereof is that the arm member 12 is constructed as described below in detail with such aims that the same may be stably supported on the front surface of the wrist member 9 and at the same time a means for expansion and contraction thereof may be comparatively simple and light.

Figure 5:
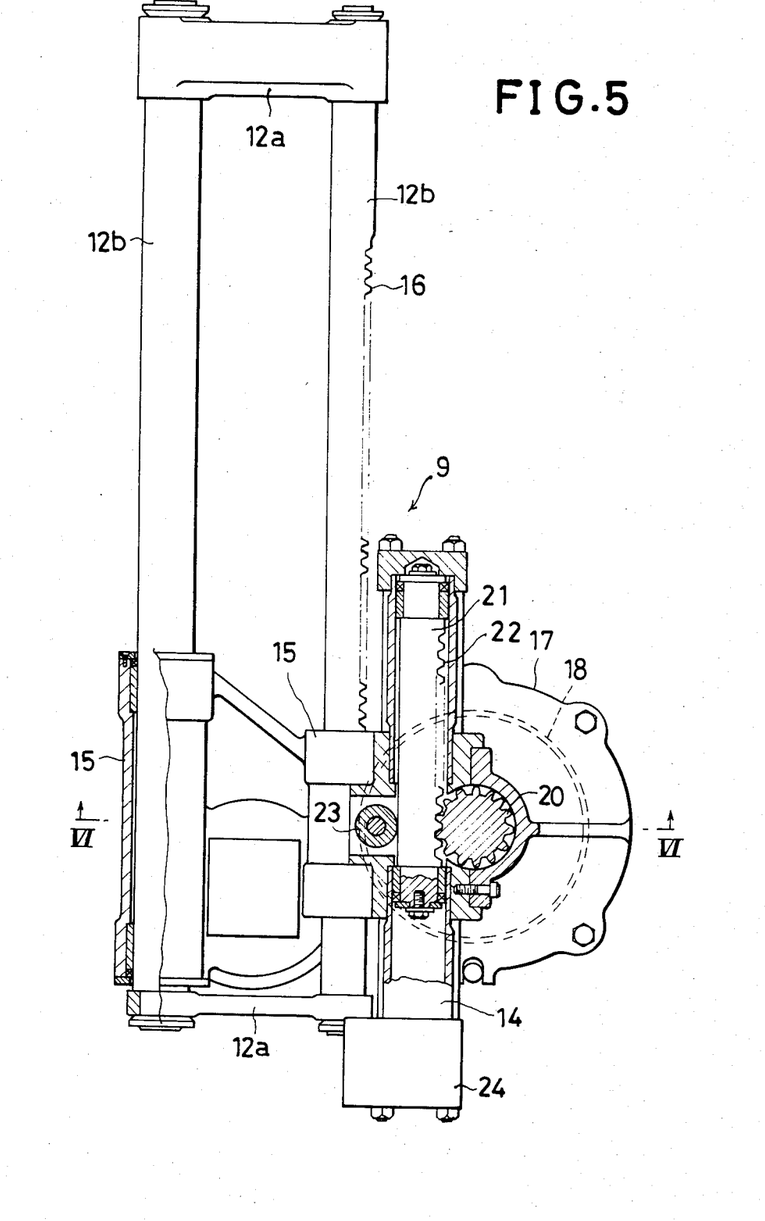

Namely, the arm member 12 is composed of a pair of right and left guide rods 12b, 12b interconnected at both ends thereof through cross members 12a, 12a as shown clearly in FIG. 5.

The rods 12b, 12b are so inserted through a pair of right and left bearing members 15, 15 provided on the front surface of the wrist member 9 as to be supported slidably thereon. One of the two rods 12b, 12b is formed on one side surface thereof with a rack 16. The rack 16 is in engagement with a gear 18 provided on the front portion of a bracket 17 extending laterally from the wrist member 9. The foregoing operation cylinder 14 for driving the gear 18 is fixedly provided ahead of the gear 18.

Figure 6:
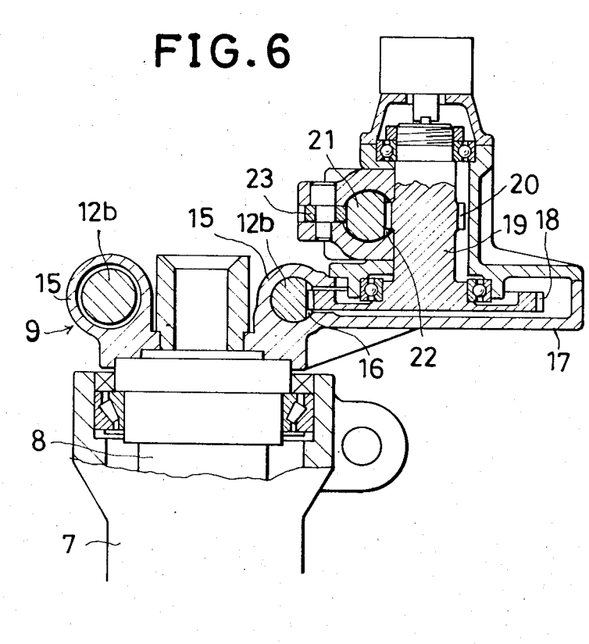
FIG. 6 is a sectional view taken along the line VI—VI in FIG. 5.

More in detail, as shown clearly in FIG. 6, the bracket 17 is in the form of a flat frame casing with the gear 18 housed therein. The operation cylinder 14 is fixedly provided on the front surface thereof. A shaft 19 extending forwards from the gear 18 is provided with a gear 20 with the gear 20 being in engagement with a rack 22 formed on the side surface of a piston 21 which is so mounted in the cylinder 14 as to be moveable upwards and downwards. In this manner, the gear 18 may be given either a regular directional rotation or a reverse directional rotation freely and consequently, the arm 12 may be given either expansion and contraction movements therethrough. A backup roller 23 supports the piston 21 from the rear surface thereof and a servo valve 24 is provided on the front surface of the cylinder for controlling the operation of the cylinder 14.

A third point thereof is directed to a feeding mechanism for an operation transformer 25 attached to the forward end of the arm member 12 together with the welding gun 13.

Figure 7:
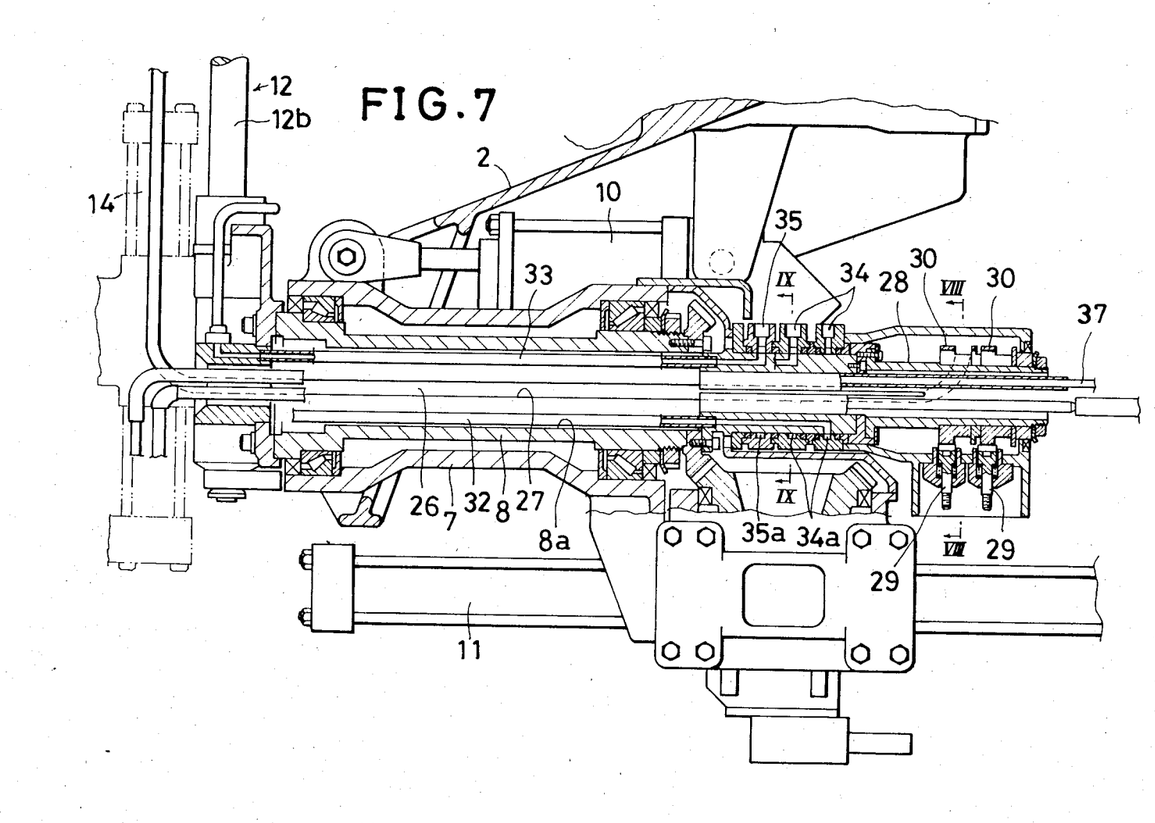
FIG. 7 is a sectional side view of a wrist main body portion thereof.
Figure 8:
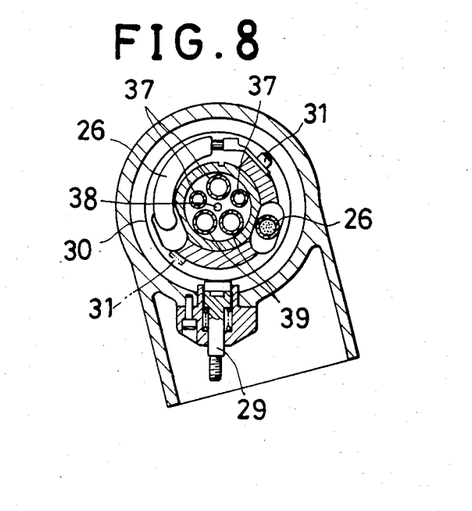
FIGS. 8 and 9 are sectional view respectively taken along the lines VIII—VIII and IX—IX in FIG. 7, and FIGS. 10 and 11 are side and front diagrams for explaining the operation of the apparatus.
Figure 9:
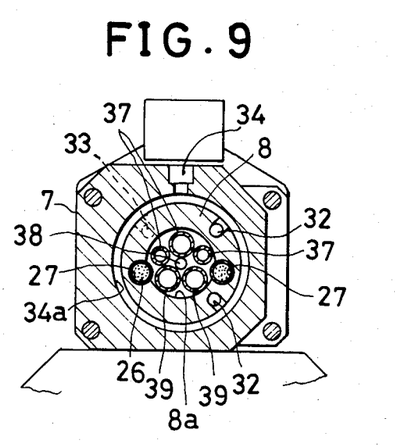

It has been usual hitherto that a pair of positive and negative feeding cables 26, 26 connecting between the transformer 25 and an external power source are hung downwards from the transformer 25 and are led sideways as they are from the transformer. This arrangement is convenient in that the cables 26, 26 are largely fluctuated as a whole by the turning of the arm member 12 and are liable to interfere with any objects arranged near them in the potential paths of movement. For removing this inconvenience, the electric feeding mechanism in the illustrated example is constructed as described below:

Namely, as shown clearly in FIGS. 7 to 9, a pair of longitudinally extending guide openings 27, 27 are made in parallel one with another in the rotary shaft 8. The shaft 8 is provided at its rear end with an extended tubular portion 28 projecting rearwards therefrom. A pair of front and rear feeding rings 30, 30 which are in slide contact with respective feeding terminals 29, 29 located at the outside thereof are fixedly provided on the outer periphery of the extended portion 28. The foregoing feeding cables 26, 16 are led out rearwards through the pair of guide openings 27, 27 and are connected to the pair of feeding rings 30, 30 by means of respective screws 31, 31 or the like.

In the illustrated example, a pair of oil passages 32, 32 for guiding pressure oil and a single air passage 33 for guiding pressure air are also made in parallel one with another in the rotary shaft 8. These are brought into communication at their rear end portions with a pair of oil supply openings 34, 34 and a single air supply opening 35 through respective annular grooves 34a, 34a, 35a so that the pressure oil and the pressure air may be supplied forwards through the interior of the shaft 8. The pressure oil is supplied to the foregoing operation cylinder 14 for serving to expand and contract the foregoing arm member 12, and the air is supplied to an air cylinder 36 of the foregoing welding gun 13 in order to serve to open and close the gun 13.

Additionally, the rotary shaft 8 is formed into a hollow shaft having therein a center axis opening 8a, and three control wires 37, 37, 37 for control signals, a single earth wire 38 and two water pipes 39, 39 for conducting cooling water are inserted through the axis opening 8a so that the control signals and the cooling water may be supplied forwards therethrough.

Thus, according to this invention, a welding work covering the whole peripheral edge of an opening portion of a car body or the like can be carried out at will so that a high working efficiency can be obtained, and the operation of the apparatus can be comparatively easy and simple because there are given any combined selective operations from the forward or rearward motion of the supporting arm, the tilting movement of the wrist base body, the rotation movement of the wrist member and the expansion and contraction movements of the arm member so that the whole of the apparatus can become comparatively small in size and low in price.

What is claimed is:

1. A robot-type welding apparatus comprising:
   a stationary main body having at least one guide rod extending therealong;
   a supporting arm provided at a lower surface of said main body and projecting substantially horizontally therefrom at a rear end portion of said supporting arm, said supporting arm being supported for movement forwardly and rearwardly along the main body along said at least one guide rod thereof, said supporting arm having a front end portion and being movable to project forwardly of the main body;
   an elongated tiltable wrist base body pivotally supported proximate a front end portion thereof on said front end portion of said supporting arm, extending substantially along and under said supporting arm in the direction of movement thereof, and tiltable about said pivotal support relative said supporting arm;
   a shaft rotatably extending longitudinally through and supported by said wrist base body, said shaft having a front end;
   an expansion arm member mounted on said wrist member substantially at right angles to said shaft, said expansion arm member being moveable along its longitudinal axis relative to said wrist member and having a forward end;
   a welding gun attached to said forward end of said expansion arm member;
   means for moving the supporting arm relative to the main body;
   means for tilting the wrist base body relative to the supporting arm;
   means for rotating the shaft relative to the wrist base body;
   means for moving the expansion arm member relative to the wrist member.

2. A robot-type welding apparatus comprising:
   a stationary main body;
   a supporting arm extending from and movable forwardly and rearwardly along the main body and having a front end portion;
   an elongated tiltable wrist base body pivotally supported proximate a front end portion thereof on said front end portion of said supporting arm;
   a shaft rotatably extending longitudinally through and supported by said wrist base body, said shaft having a front end;
   a wrist member fixed to said front end of said shaft having a front surface;
   an expansion arm member mounted on said wrist member substantially at right angles to said shaft, said expansion arm member being moveable along its longitudinal axis relative to said wrist member and having a forward end;
   a welding gun attached to said forward end of said expansion arm member;
   means for moving the supporting arm relative to the main body;
   means for tilting the wrist base body relative to the supporting arm;
   means for rotating the shaft relative to the wrist base body; and
   means for moving the expansion arm member relative to the wrist member;
   wherein the expansion arm member comprises a pair of right and left guide rods interconnected at both ends thereof through respective cross members, said guide rods being inserted through a pair of right and left bearing members provided on the front surface of the wrist member as to be supported slideably thereon, one of said guide rods having on one side surface thereof a rack, and said means for moving the expansion arm member comprises a bracket extending laterally from the wrist member having a front portion, a gear provided on said front portion in engagement with said rack, and an operation cylinder driving the gear and provided ahead of the gear.

3. A robot-type welding apparatus comprising;
   a stationary main body;
   a supporting arm extending from and movable forwardly and rearwardly along the main body and having a front end portion;
   an elongated tiltable wrist base body pivotally supported proximate a front end portion thereof on said front end portion of said supporting arm;
   a shaft rotatably extending longitudinally through and supported by said wrist base body, said shaft having a front end;
   a wrist member fixed to said front end of said shaft having a front surface;
   an expansion arm member mounted on said wrist member substantially at right angles to said shaft, said expansion arm member being moveable along its longitudinal axis relative to said wrist member and having a forward end;
   a welding gun attached to said forward end of said expansion arm member;
   means for moving the supporting arm relative to the main body;
   means for tilting the wrist base body relative to the supporting arm;
   means for rotating the shaft relative to the wrist base body; and
   means for moving the expansion arm member relative to the wrist member;
   wherein said expansion arm member is provided at its front end portion with an operation transformer for the welding gun, and said shaft is provided with a pair of longitudinally extending guide openings formed therein, an extended portion projecting from a rear end portion of the shaft, a pair of front and rear feeding rings arranged in sliding contact with feeding terminals on the laterally outside thereof fixedly provided on the periphery of the extended portion, and a pair of positive and negative feeding cables extending from the transformer passing through the pair of guide openings and extending rearwards for being connected to the pair of feeding rings by means of respective screws or the like.

4. An apparatus as claimed in claim 2, wherein set expansion arm member is provided at its front end portion with an operation transformer for the welding gun, and said shaft is provided with a pair of longitudinally extending guide openings formed therein, an extended portion projecting from a rear end portion of the shaft, a pair of front and rear feeding rings arranged in sliding contact with feeding terminals on the laterally outside thereof fixedly provided on the periphery of the extended portion, and a pair of positive and negative feeding cables extending from the transformer passing through the pair of guide openings and extending rearwards for being connected to the pair of feeding rings by means of respective screws or the like.

* * * * *

UNITED STATES PATENT AND TRADEMARK OFFICE
CERTIFICATE OF CORRECTION

PATENT NO. : 4,542,845

DATED : September 24, 1985

INVENTOR(S) : Genzo FUSE

It is certified that error appears in the above-identified patent and that said Letters Patent is hereby corrected as shown below:

On the cover page, Item [30], the third Foreign Application, change "Apr. 23, 1981" to --Apr. 24, 1981--;

Item [57], line 7 of the Abstract, change "6" to --fixed--.

Signed and Sealed this

Twenty-second Day of July 1986

[SEAL]

Attest:

DONALD J. QUIGG

Attesting Officer

Commissioner of Patents and Trademarks